(12) United States Patent
Chang et al.

(10) Patent No.: US 8,179,138 B2
(45) Date of Patent: May 15, 2012

(54) CRT TEST SYSTEM

(75) Inventors: Hsiang Chang, Taipei Hsien (TW);
Cheng-Hsuan Tsai, Taipei Hsien (TW);
Ming-Chang Liu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 389 days.

(21) Appl. No.: 12/591,469

(22) Filed: Nov. 20, 2009

(65) Prior Publication Data
US 2010/0295949 A1    Nov. 25, 2010

(30) Foreign Application Priority Data
May 20, 2009  (TW) .............................. 98116794 A

(51) Int. Cl.
*G01R 31/00* (2006.01)
(52) U.S. Cl. ....................................... 324/404; 348/189
(58) Field of Classification Search ........................ None
See application file for complete search history.

(56) References Cited

U.S. PATENT DOCUMENTS 4,439,735 A * 3/1984 Alvite et al. .................. 324/404
4,764,728 A * 8/1988 Sato et al. ..................... 324/512

* cited by examiner

*Primary Examiner* — Minh N Tang
(74) *Attorney, Agent, or Firm* — Bacon & Thomas, PLLC

(57) ABSTRACT

A cathode ray tube (CRT) test system for testing a CRT device is disclosed. The CRT test system comprises a connecting device, a power module, a control module, a first test module, and an illumination module. The connecting device detachably and electrically connects with the CRT device; the power module electrically connects with the connecting device; the control module electrically connects with the connecting device; and the control module comprises test program. After the CRT device receives a control signal transmitted from the test program, the CRT device generates a response signal and transmits the response signal to the first test module. When the first test module detects that the control signal and the response signal fit in with a first test signal status, the illumination module displays a first light sign; when the control signal and the response signal do not fit in with the first test signal status, the illumination module displays a second light sign.

27 Claims, 5 Drawing Sheets

CRT TEST SYSTEM

BACKGROUND OF THE INVENTION

1. Field of the Invention

The present invention relates to a cathode ray tube (CRT) test system; more particularly, the present invention relates to a CRT test system capable of quickly testing whether a display function of a CRT device works properly.

2. Description of the Related Art

In a conventional method for testing a cathode ray tube (CRT) device (in the form of either a printed circuit board assembly or an assembled finished product), the CRT device is connected to a CRT monitor used for testing. By means of utilizing a program to control the CRT device to display frames such as red, green, blue, or white frames, a test engineer needs to verify whether the frame displayed on the CRT monitor is normal. However, the conventional method of using the CRT monitor to test the CRT device has the following disadvantages: (1) the CRT monitor occupies a lot of space, thus requiring a large space to place the CRT monitor; (2) the test response time of the CRT monitor is very slow; (3) the CRT monitor is power-consuming and has high radiation; (4) the CRT monitor has higher cost and has a risk of electrostatic discharge (ESD); and (5) the conventional test method has a high labor cost.

Therefore, there is a need to provide a CRT test system to mitigate and/or obviate the aforementioned problems.

SUMMARY OF THE INVENTION

It is an object of the present invention to provide a cathode ray tube (CRT) test system capable of quickly testing a CRT device.

It is another object of the present invention to provide a CRT test system without using an external power source and with low radiation.

It is yet another object of the present invention to provide a low-cost CRT test system.

To achieve the abovementioned objects, the present invention provides a CRT test system for testing a CRT device. The CRT test system comprises a connecting device, a power module, a control module, a first test module and an illumination module. The connecting device is capable of detachably and electrically connecting with the CRT device, and the power module is used for receiving power from a power source for supporting operations of the CRT test system; the control module electrically connects with the connecting device, wherein the control module comprises a test program, the control module transmits a control signal to the CRT device according to the test program, and the control module further receives a response signal from the CRT device corresponding to the control signal; the first test module electrically connects with the control module and detecting the control signal and the response signal; and the illumination electrically connects with the first test module.

When the first test module detects that the control signal and the response signal fit in with a first test signal status, the illumination module displays a first light sign; when the control signal and the response signal do not fit in with the first test signal status, the illumination module displays a second light sign.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
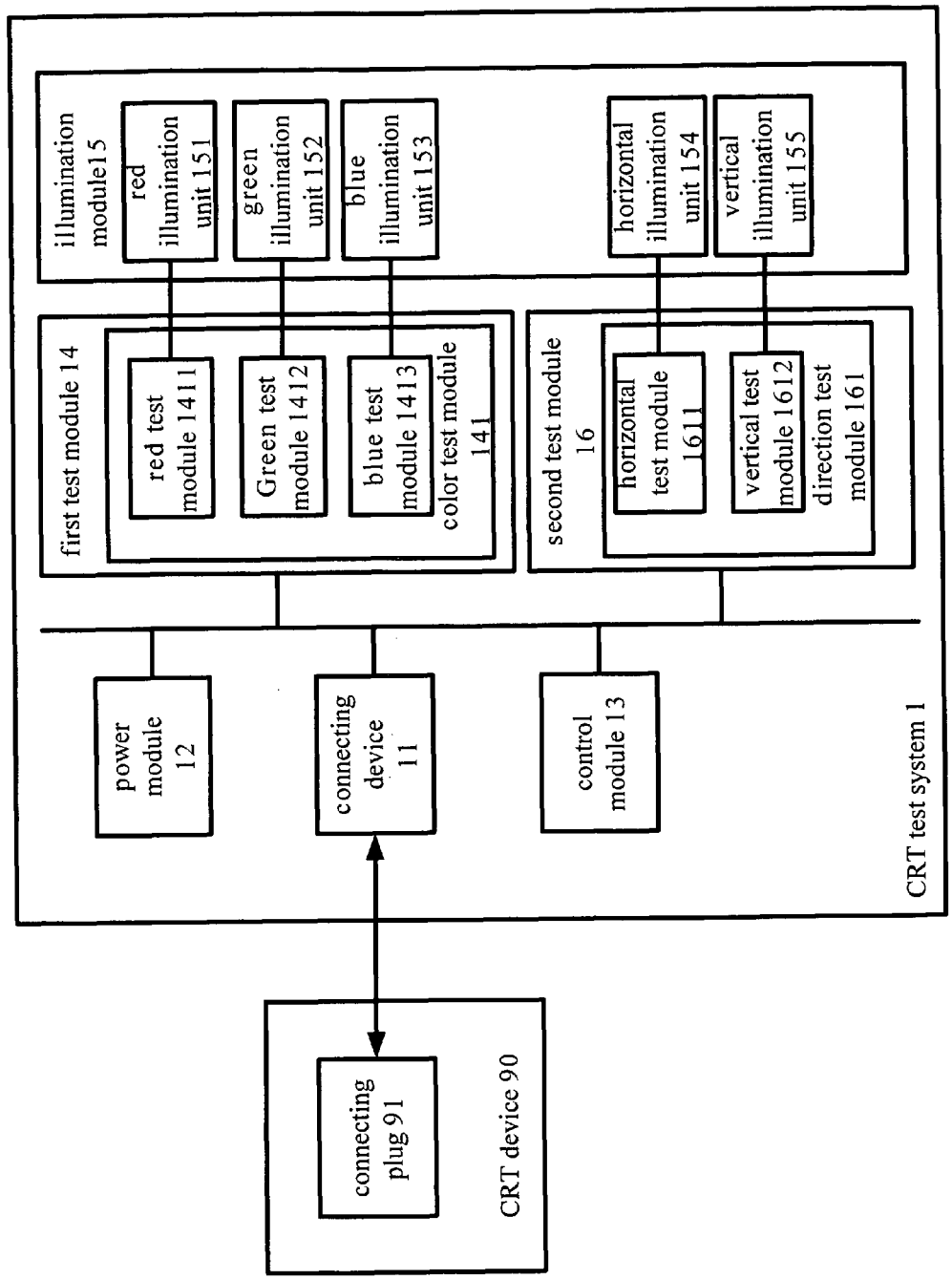
FIG. 1 illustrates a hardware structure of a cathode ray tube (CRT) test system according to one embodiment of the present invention.

Please refer to FIG. 1, which illustrates a hardware structure of a cathode ray tube (CRT) test system according to one embodiment of the present invention.

As shown in FIG. 1, the present invention discloses a CRT test system 1, wherein a CRT device 90 comprises a connecting plug 91.

The CRT test system 1 comprises a connecting device 11, a power module 12, a control module 13, a first test module 14, a second test module 16, and an illumination module 15.

The first test module 14 comprises at least one color test module 141. In one embodiment of the present invention, the color test module 141 comprises a red test module 1411, a green test module 1412, and a blue test module 1413. The second test module 16 comprises at least one direction test module 161. In one embodiment of the present invention, the direction test module 161 comprises a horizontal test module 1611 and a vertical test module 1612.

The connecting device 11 is capable of detachably and electrically connecting with the connecting plug 91; the power module 12 electrically connects with the connecting device 11; the control module 13 electrically connects with the connecting device 11, wherein the control module 13 comprises a test program; the first test module 14 and the second test module 16 electrically connect with the control module 13; and the illumination module 15 electrically connects with both the first test module 14 and the second test module 16. In one embodiment of the present invention, the control module 13 comprises, but is not limited to, a chipset.

In one embodiment of the present invention, when the connecting device 11 electrically connects with the connecting plug 91, the connecting plug 91 can transmit red signals, green signals, blue signals, 5V power signals, horizontal signals, vertical signals, and display data channel (DDC) signals to the connecting device 11. Please note that the signals transmitted from the connecting plug 91 are not limited to the abovementioned description.

In one embodiment of the present invention, the power module 12 is used for receiving a power source from the CRT device 90 so as to support operations of the CRT test system 1, wherein the power source of the CRT device 90 is the 5V power signal. Therefore, the CRT test system 1 of the present invention does not need an external power source.

In one embodiment of the present invention, the control module 13 executes the test program so as to transmit a control signal to the CRT device 90 according to the test program, and the control module 13 further receives a response signal from the CRT device 90 corresponding to the control signal.

In one embodiment of the present invention, the control signals comprise red display signals, green display signals, blue display signals, red-green-blue mixed display signals, horizontal display signals, and vertical display signals, wherein the above signals are respectively used for controlling an output display status of the CRT device 90. For example, if the control signals comprise the red display signal, the CRT device 90 is controlled to output a red signal; if the control signals comprise the green display signal, the CRT device 90 is controlled to output a green signal; and so on.

When the first test module 14 detects that the control signal and the response signal fit in with a first test signal status, the illumination module 15 displays a first light sign; when the control signal and the response signal do not fit in with the first test signal status, the illumination module 15 displays a second light sign.

In one embodiment of the present invention, the first test signal status is a color signal status. In one embodiment of the present invention, the color signal status corresponds to the above red display signal, green display signal, blue display signal, and red-green-blue mixed display signal, such that the CRT device 90 can correctly output a corresponding color test signal. Please note that the scope of the present invention is not limited to the above description.

If the color test module 141 detects that the control signal and the response signal fit in with the color signal status, the illumination module 15 displays the first light sign; when the control signal and the response signal do not fit in with the color signal status, the illumination module 15 displays the second light sign. In one embodiment of the present invention, the first light sign is to illuminate; while the second light sign is not to illuminate. Please note that the scope of the first light sign and the second light sign is not limited to the above description.

When the second test module 16 detects that the control signal and the response signal fit in with a second test signal status, the illumination module 15 displays a third light sign; when the control signal and the response signal do not fit in with the second test signal status, the illumination module 15 displays a fourth light sign. In one embodiment of the present invention, the second test signal status is a direction signal status, and the direction test module 161 is used for detecting whether the control signal and the response signal fit in with the direction signal status. In one embodiment of the present invention, the direction signal status corresponds to the above horizontal display signal and vertical display signal, such that the CRT device 90 can correctly output a corresponding direction test signal. Please note that the scope of the present invention is not limited to the above description.

When the direction test module 161 detects that the control signal and the response signal fit in with the direction signal status, the illumination module 15 displays the third light sign; when the control signal and the response signal do not fit in with the direction signal status, the illumination module 15 displays the fourth light sign. In one embodiment of the present invention, the third light sign is to illuminate, and the fourth light sign is not to illuminate. Please note that the scope of the third light sign and the fourth light sign are not limited to the above description.

In one embodiment of the present invention, the illumination module 15 comprises a red illumination unit 151, a green illumination unit 152, a blue illumination unit 153, a horizontal illumination unit 154, and a vertical illumination unit 155. The red illumination unit 151 electrically connects with the red test module 1411; the green illumination unit 152 electrically connects with the green test module 1412; the blue illumination unit 153 electrically connects with the blue test module 1413; the horizontal illumination unit 154 electrically connects with the horizontal test module 1611; and the vertical illumination unit 155 electrically connects with the vertical test module 1612. In one embodiment of the present invention, each of the abovementioned illumination units comprises, but is not limited to, a light-emitting diode (LED).

In one embodiment of the present invention, the first light sign refers to the status that the corresponding red illumination unit 151, green illumination unit 152, or blue illumination unit 153 illuminates; and the third light sign refers to the status that the corresponding horizontal illumination unit 154 or vertical illuminate unit 155 illuminates. Please note that the scope of the present invention is not limited to the above description.

The method of utilizing the first test module to detect whether the control signal and the response signal fit in with the first test signal status and the method of utilizing the second test module to detect whether the control signal and the response signal fit in with the second test signal status will be explained hereinafter in detail.

In one embodiment of the present invention, the control module 13 transmits each control signal to the CRT device 90. Please note that a transmitting order of each control signal can be set up by a user; alternatively, a plurality of control signals can be transmitted at the same time. For example, the transmitting order of the control signals can be red display signal, green display signal, blue display signal, and red-green-blue mixed display signal by turns. The control signals transmitted for each time can also comprise, but are not limited to, the horizontal display signal and the vertical display signal.

After the CRT device 90 receives the control signal, it then transmits a corresponding response signal to be returned to either the first test module 14 or the second test module 16. For example, if the control signal is the red display signal, the response signal comprises a red signal; if the control signal is the green display signal, the response signal comprises a green signal; and so on.

In one embodiment of the present invention, if the response signal comprises a red signal, the response signal will be transmitted to the red test module 1411, wherein the red test module 1411 is used for testing whether the red signal fits in with the color signal status. In one embodiment of the present invention, if the response signal comprises a green signal, the response signal will be transmitted to the green test module 1412, wherein the green test module 1412 is used for testing whether the green signal fits in with the color signal status. In one embodiment of the present invention, if the response signal comprises a blue signal, the response signal will be transmitted to the blue test module 1413, wherein the blue test module is used for testing whether the blue signal fits in with the color signal status. The procedure of processing other signals of the response signal is the same as the procedure of the abovementioned description; therefore, there is no need for further detailed description.

In one embodiment of the present invention, if the response signal comprises a horizontal signal, the response signal will be transmitted to the horizontal test module 1611, wherein the horizontal test module 1611 is used for testing whether the horizontal signal fits in with the direction signal status. In one embodiment of the present invention, if the response signal comprises a vertical signal, the response signal will be transmitted to the vertical test module 1612, wherein the vertical test module 1612 is used for testing whether the vertical signal fits in with the direction signal status.

In one embodiment of the present invention, the first test module 14 (including the red test module 1411, the green test module 1412, and the blue test module 1413) or the second test module 16 (including the horizontal test module 1611 and the vertical test module 1612) is a comparator. If the red signal, the green signal, the blue signal, the horizontal signal, or the vertical signal respectively exceeds a corresponding specific voltage value, each of the test modules will detect whether the signal fits in with the color signal status or the direction signal status. Please note that the scope of the present invention is not limited to the above description. In one embodiment of the present invention, if each of the test modules detects that each of the response signals does not fit in with the color signal status nor the direction signal status (which means the red signal, the green signal, the blue signal, the horizontal signal, or the vertical signal respectively does not exceed its corresponding voltage value), the corresponding illumination module 15 will not illuminate. Please note that the scope of the present invention is not limited to the above description.

In one embodiment of the present invention, the CRT test system 1 of the present invention can be applied to a CRT circuit board or a CRT finished product (such as a CRT monitor).

Figure 2:
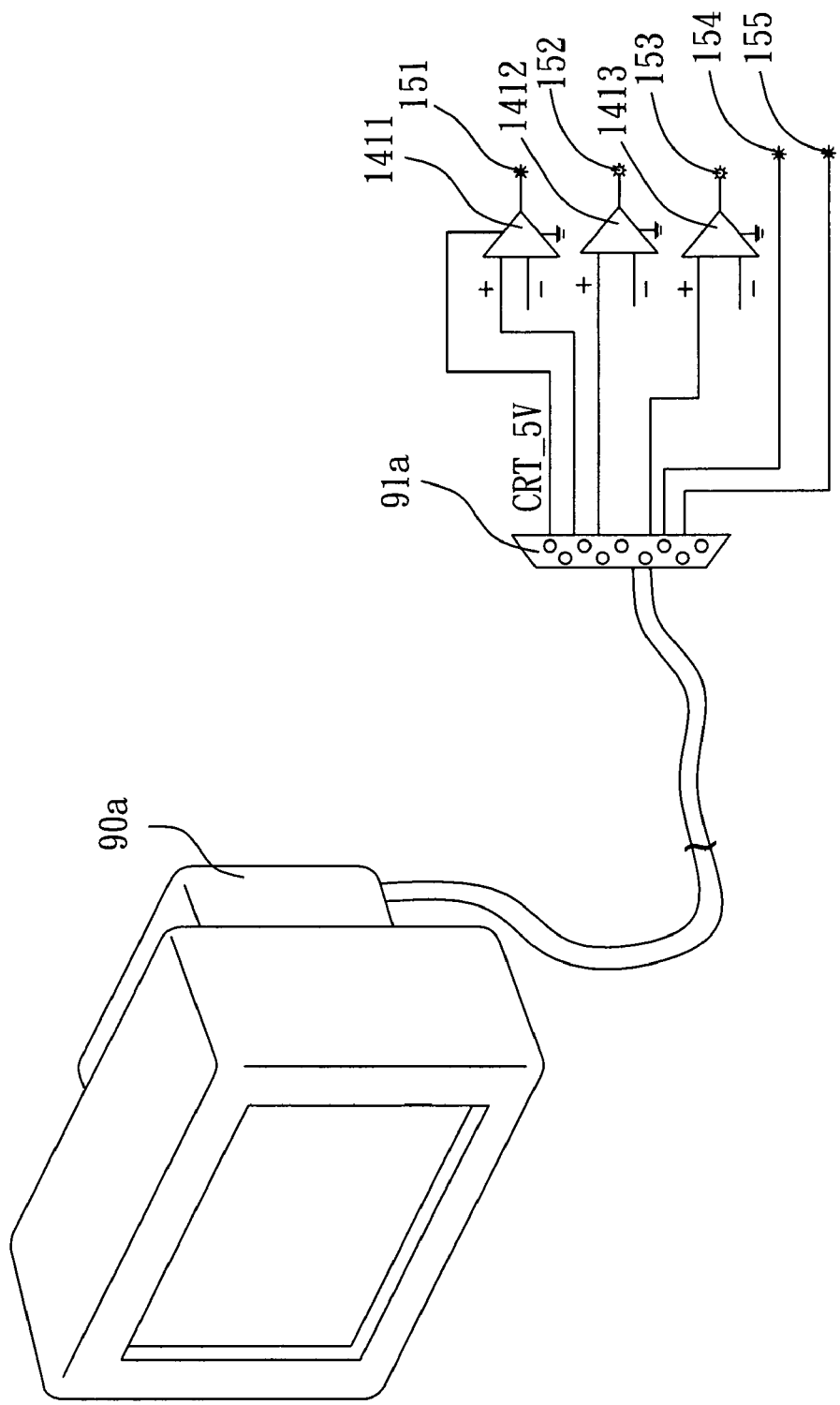
FIG. 2 illustrates a correlation schematic drawing of the CRT test system according to one embodiment of the present invention.
Figure 3:
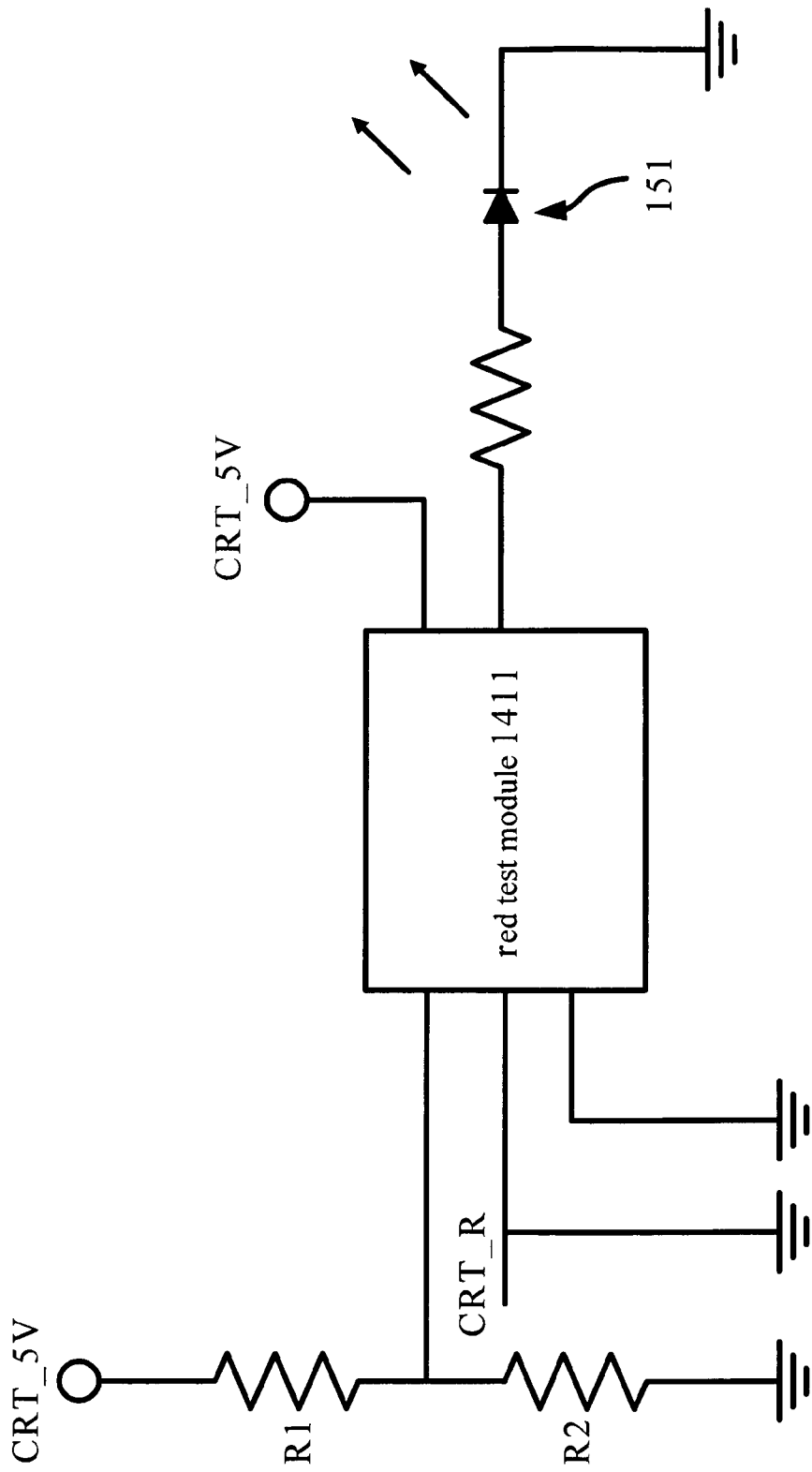
FIG. 3 illustrates an equivalent circuit diagram showing a red test module that tests whether a red signal is in a color signal status.

Please refer to both FIG. 2 and FIG. 3, wherein FIG. 2 illustrates a correlation schematic drawing of the CRT test system according to one embodiment of the present invention.

As shown in FIG. 2, the CRT test system 1 of the present invention electrically connects with the CRT device 90a, and the connecting device (not shown in FIG. 2) detachably and electrically connects with the connecting plug 91a. In one embodiment of the present invention, the CRT device 90a is a CRT finished product (such as a CRT monitor).

In one embodiment of the present invention, the CRT test system 1 comprises only the red test module 1411, the green test module 1412, the blue test module 1413, the red illumination unit 151, the green illumination unit 152, the blue illumination unit 153, the horizontal illumination unit 154, and the vertical illumination unit 155. Please note that in one embodiment of the present invention, the CRT test system 1 is not equipped with the horizontal test module and the vertical test module. Therefore, when the CRT device 90a is undergoing the test procedure, the horizontal illumination unit 154 and the vertical illumination unit 155 keep illuminating. But please note that the scope of the present invention is not limited to the above description.

Please refer to FIG. 3, which illustrates an equivalent circuit diagram showing a red test module that tests whether a red signal fits in with a color signal status.

As shown in FIG. 3, the red test module 1411 is a comparator, and the specific voltage value is set as 1.8V. After the CRT test system 1 electrically connects with the CRT device 90a, a CRT__5V pin of the CRT test system 1 receives a 5V power signal transmitted from the CRT device 90a, and the 5V power signal can be converted into 1.8V via resistance R1 and resistance R2. The control signal comprises the red display signal. After the control signal is transmitted to the CRT device 90a, the CRT device 90a is controlled to output a red signal to a CRT_R pin of the CRT test system 1. If the outputted red signal exceeds its corresponding specific voltage value (for example, the outputted red signal is 2V), the red test module 1411 will detect that the outputted red signal fits in with the color signal status, such that the red test module 1411 will transmit a signal to drive the red illumination unit 151 to illuminate. Please note that the specific voltage value is set according to the color signal status, and is not limited to 1.8V as described above. The green test module 1412 and the blue test module 1413 operate similarly to the red test module 1411; therefore, there is no need for further description.

Figure 4A:
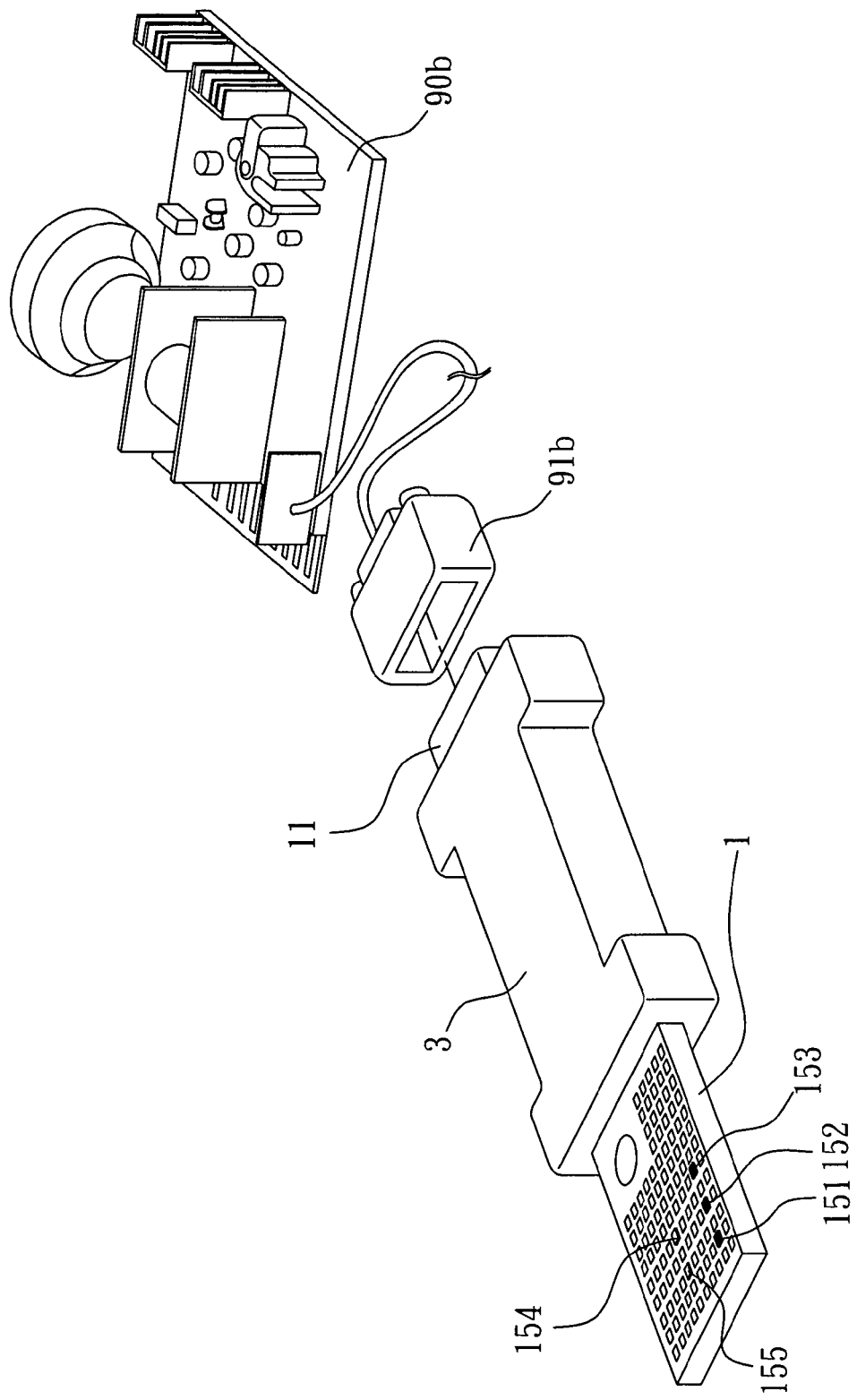
FIG. 4A illustrates a schematic drawing of the CRT test system being applied to a CRT circuit board according to one embodiment of the present invention.

Please refer to FIG. 4A, which illustrates a schematic drawing of the CRT test system being applied to a CRT circuit board according to one embodiment of the present invention.

As shown in FIG. 4A, the CRT test system 1 of the present invention electrically connects with the CRT device 90b, so as to test whether a display function of the CRT device 90b works properly, wherein the CRT device 90b is a CRT circuit board. When a test engineer electrically connects the connecting device 11 of the CRT test system 1 with the connecting plug 91b of the CRT device 90b, the test engineer can detect whether the CRT device 90b works properly only by observing whether the red illumination unit 151, the green illumination unit 152, the blue illumination unit 153, the horizontal illumination unit 154, and the vertical illumination unit 155 are illuminating.

Figure 4B:
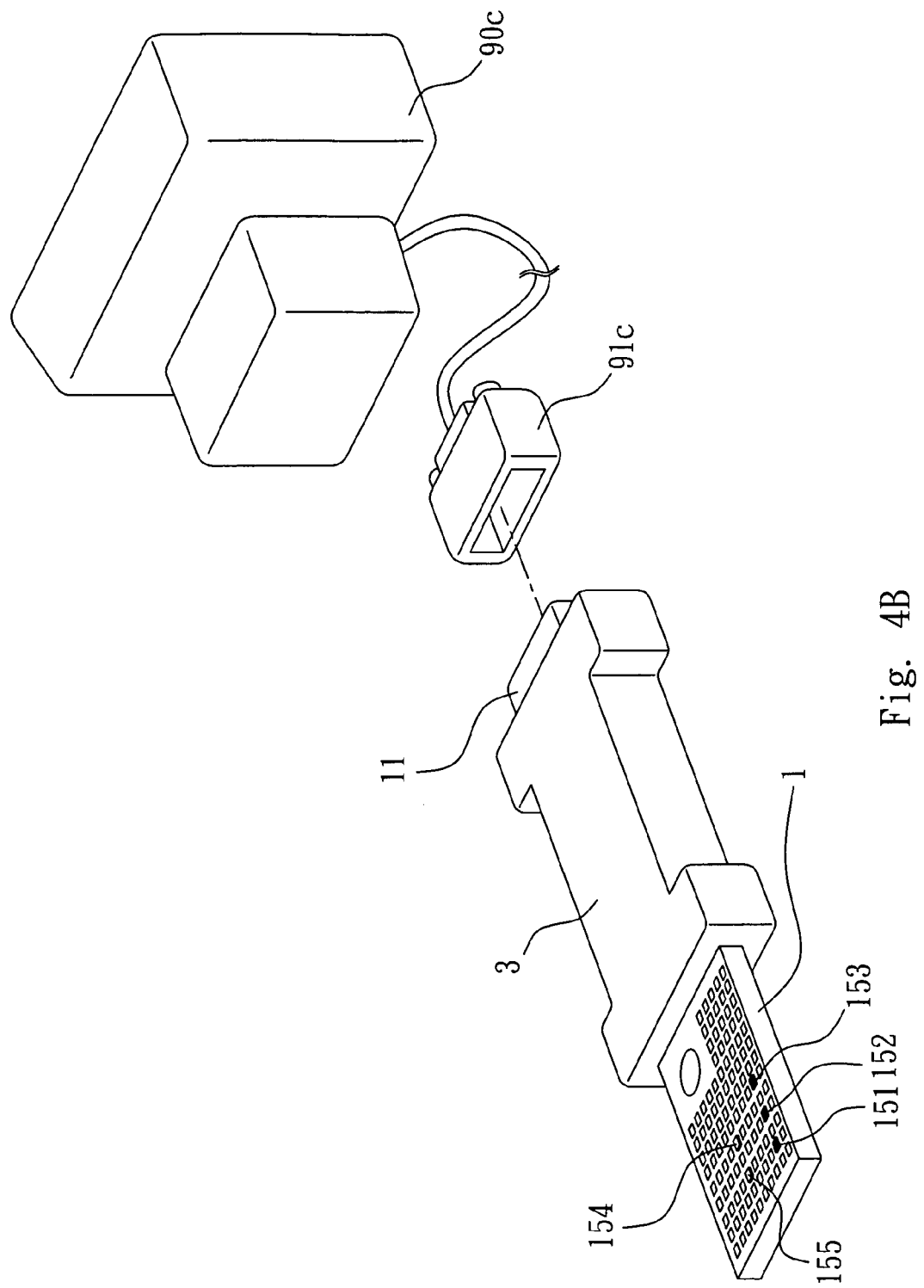
FIG. 4B illustrates a schematic drawing of the CRT test system being applied to a CRT finished product according to one embodiment of the present invention.

Please refer to FIG. 4B, which illustrates a schematic drawing of the CRT test system being applied to a CRT finish product according to one embodiment of the present invention.

As shown in FIG. 4B, in another embodiment of the present invention, the connecting device 11 of the CRT test system 1 of the present invention electrically connects with the connecting plug 91c of the CRT device 90c, so as to test whether the display function of the CRT device 90c works properly, wherein the CRT device 90c is a CRT finished product (such as a CRT monitor).

Similarly, when the test engineer electrically connects the CRT test system 1 with the connecting plug 91b of the CRT device 90c, the test engineer can detect whether the CRT device 90c works properly only by observing whether the red illumination unit 151, the green illumination unit 152, the blue illumination unit 153, the horizontal illumination unit 154, and the vertical illumination unit 155 are illuminating.

Because the CRT test system of the present invention has a lower cost, and the test method is fast, simple, and does not need an external power source, the present invention can achieve the object of quickly testing a CRT device at lower radiation as well as lower cost.

Although the present invention has been explained in relation to its preferred embodiments, it is to be understood that many other possible modifications and variations can be made without departing from the spirit and scope of the invention as hereinafter claimed.

What is claimed is:

1. A cathode ray tube (CRT) test system for testing a CRT device, the CRT test system comprising:
   a connecting device, capable of detachably and electrically connecting with the CRT device;
   a power module, electrically connecting with the connecting device, wherein the power module is used for receiving a power source for supporting operations of the CRT test system;
   a control module, electrically connecting with the connecting device, wherein the control module comprises a test program, the control module transmits a control signal to the CRT device according to the test program, and the control module further receives a response signal from the CRT device corresponding to the control signal;
a first test module, electrically connecting with the control module and detecting the control signal and the response signal; and
an illumination module, electrically connecting with the first test module;
wherein when the first test module detects that the control signal and the response signal fit in with a first test signal status, the illumination module displays a first light sign; when the control signal and the response signal do not fit in with the first test signal status, the illumination module displays a second light sign.

2. The CRT test system as claimed in claim 1, wherein the first test module comprises at least one color test module, and the first test signal status is a color signal status; when the color test module detects that the control signal and the response signal fit in with the color signal status, the illumination module displays the first light sign; when the control signal and the response signal do not fit in with the color signal status, the illumination module displays the second light sign.

3. The CRT test system as claimed in claim 2, wherein the at least one color test module is selected from at least one of the following groups: a red test module, a green test module, and a blue test module.

4. The CRT test system as claimed in claim 1, wherein the first light sign is to illuminate.

5. The CRT test system as claimed in claim 1, wherein the second light sign is not to illuminate.

6. The CRT test system as claimed in claim 1 further comprising a second test module, wherein when the second test module detects that the control signal and the response signal fit in with a second test signal status, the illumination module displays a third light sign; when the control signal and the response signal do not fit in with the second test signal status, the illumination module displays a fourth light sign.

7. The CRT test system as claimed in claim 6, wherein the second test module further comprises at least one direction test module, and the second test signal status is a direction signal status; when the direction test module detects that the control signal and the response signal fit in with the direction signal status, the illumination module displays the third light sign; when the control signal and the response signal do not fit in with the direction signal status, the illumination module displays the fourth light sign.

8. The CRT test system as claimed in claim 7, wherein the at least one direction test module is selected from at least one of the following groups: a horizontal test module and a vertical test module.

9. The CRT test system as claimed in claim 6, wherein the third light sign is to illuminate.

10. The CRT test system as claimed in claim 6, wherein the fourth light sign is not to illuminate.

11. The CRT test system as claimed in claim 6, wherein the first test module or the second test module is a comparator.

12. The CRT test system as claimed in claim 1, wherein the CRT device is a CRT circuit board.

13. The CRT test system as claimed in claim 1, wherein the connecting plug is used for providing a power signal, and the power module is used for receiving the power signal for supporting operations of the CRT test system.

14. The CRT test system as claimed in claim 1, wherein the illumination module comprises at least one light emitting diode (LED).

15. A CRT test system for testing a CRT device, the CRT test system comprising:
a connecting device, capable of detachably and electrically connecting with the CRT device;
a power module, electrically connecting with the connecting device, wherein the power module is used for receiving a power source for supporting operations of the CRT test system;
a control module, electrically connecting with the connecting device, wherein the control module comprises a test program, the control module transmits a control signal to the CRT device according to the test program, and the control module further receives a response signal from the CRT device corresponding to the control signal;
a first test module, electrically connecting with the control module and detecting the control signal and the response signal, wherein the first test module comprises a color test module, which comprises a red test module, a green test module, and a blue test module; and
an illumination module, electrically connecting with the first test module;
wherein when the first test module detects that the control signal and the response signal fit in with a first test signal status, the illumination module displays a first light sign; when the control signal and the response signal do not fit in with the first test signal status, the illumination module displays a second light sign.

16. The CRT test system as claimed in claim 15, wherein the first response signal status is a color signal status; when the color test module detects that the response signal fit in with the color signal status, the illumination module displays the first light sign; when the color test module detects that the control signal and the response signal do not fit in with the color signal status, the illumination module displays the second light sign.

17. The CRT test system as claimed in claim 15, wherein the first light sign is to illuminate.

18. The CRT test system as claimed in claim 15, wherein the second light sign is not to illuminate.

19. The CRT test system as claimed in claim 15 further comprising a second test module, wherein when the second test module detects that the control signal and the response signal fit in with a second test signal status, the illumination module displays a third light sign; when the control signal and the response signal do not fit in with the second test signal status, the illumination module displays a fourth light sign.

20. The CRT test system as claimed in claim 19, wherein the second test module further comprises at least one direction test module, and the second test signal status is a direction signal status; when the direction test module detects that the control signal and the response signal fit in with the direction signal status, the illumination module displays the third light sign; when the control signal and the response signal do not fit in with the direction signal status, the illumination module displays the fourth light sign.

21. The CRT test system as claimed in claim 20, wherein the at least one direction test module is selected from at least one of the following groups: a horizontal test module and a vertical test module.

22. The CRT test system as claimed in claim 20, wherein the third light sign is to illuminate.

23. The CRT test system as claimed in claim 20, wherein the fourth light sign is not to illuminate.

24. The CRT test system as claimed in claim 20, wherein the first test module or the second test module is a comparator.

25. The CRT test system as claimed in claim 15, wherein the CRT device is a CRT circuit board.

26. The CRT test system as claimed in claim 15, wherein the connecting plug is used for providing a power signal, and the power module is used for receiving the power signal for supporting operations of the CRT test system.

27. The CRT test system as claimed in claim 15, wherein the illumination module comprises at least one LED.

* * * * *